May 17, 1966 K. J. KORPI 3,251,555

ROCKET GUIDANCE DEVICE

Filed March 21, 1963

INVENTOR.
KARL J. KORPI
BY Edward O. Ansell
ATTORNEY

United States Patent Office 3,251,555
Patented May 17, 1966

3,251,555
ROCKET GUIDANCE DEVICE
Karl J. Korpi, Los Angeles, Calif., assignor to Aerojet-General Corporation, Azusa, Calif., a corporation of Ohio
Filed Mar. 21, 1963, Ser. No. 266,939
3 Claims. (Cl. 239—265.19)

The present invention relates to the guidance of missiles and the like propelled by rocket motors. Such motors, as is well-known, are fitted with exhaust nozzles to secure optimum flow of the hot gaseous exhaust from the rocket motor.

The rocket exhaust flows through the nozzle at supersonic speed and at very high temperatures.

Rotatable vanes have been arranged in the nozzles of rocket motors for guidance purposes but have not been satisfactory because of the very severe conditions to which the vanes and the mountings therefor are subjected. The leading edge of the vane and any parts projecting from the inner surface of the nozzle to support the vane in position and/or actuate the vane may cause the formation of shock waves and result in severe erosion at those areas.

It is an object of this invention to mount a rotatable vane in the exhaust stream flowing through the nozzle of a rocket engine so that only the leading edge of a streamlined vane is impinged upon by the exhaust stream, the mounting and controlling means for the vane either being arranged effectively flush with the inner surface of the nozzle or arranged outwardly of the inner surface of the nozzle.

A further object of the invention is to provide a mounting arrangement for an adjustable vane mounted in a rocket engine nozzle which arrangement provides increased rigidity of the vane while also providing ease of adjustment in assembling the vane in position in the nozzle.

Another object of the invention is to provide anti-friction means effective to reduce the force required to vary the angular position of the adjustable vane, thus increasing the sensitivity of response of the vane to control means.

Still further objects and features of the invention will hereinafter appear from the following description read in conjunction with the accompanying illustrative drawing wherein.

Figures 1, 2, 3:
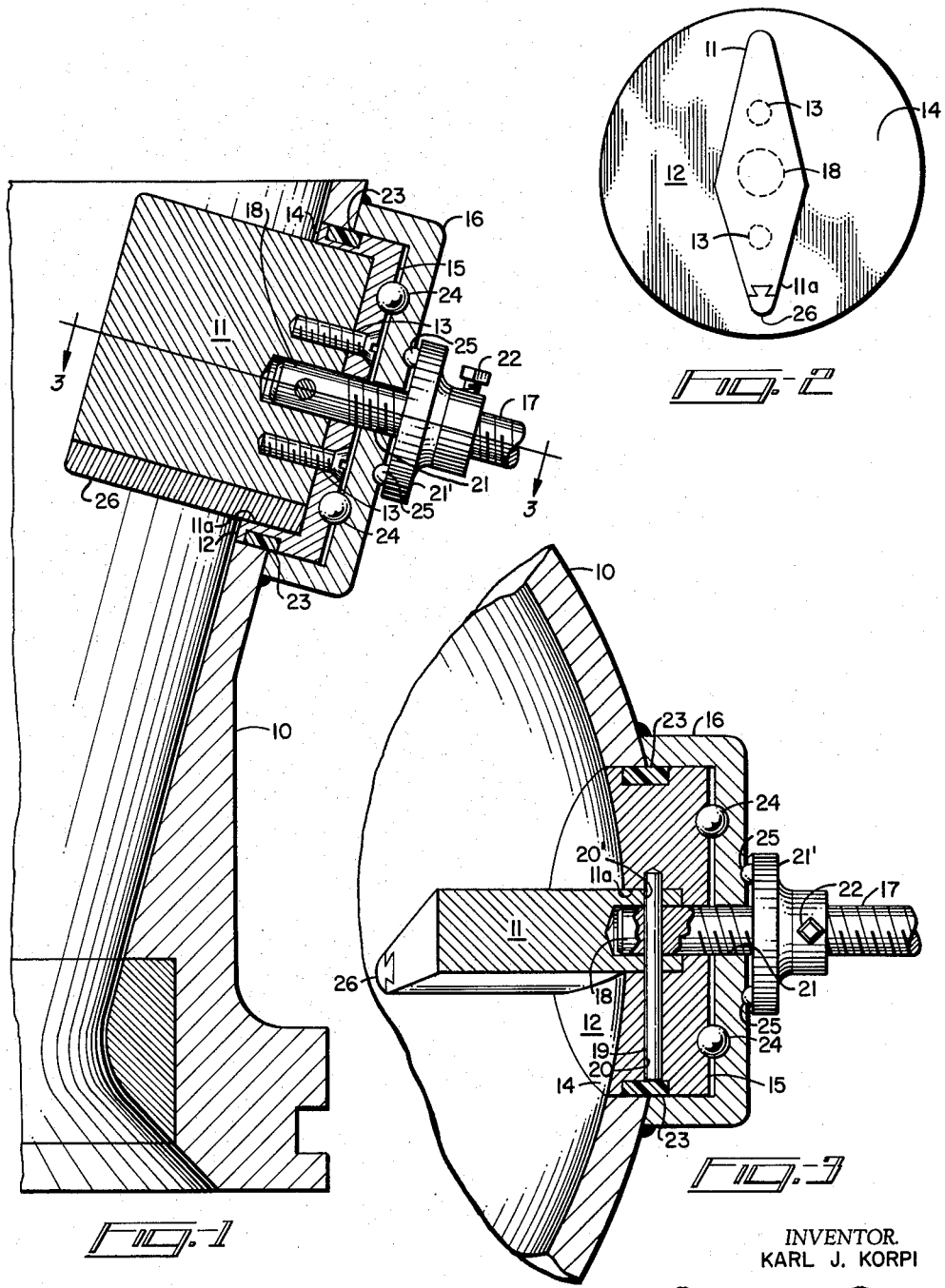
FIGURE 1 is a fragmentary longitudinal section through the outer end of a rocket nozzle fitted with a rotatable vane in the nozzle incorporating the features of this invention.
FIGURE 2 is a view looking at the inner end of a streamlined vane mounted in a rotatable disc.
FIGURE 3 is a fragmentary section on the line 3—3 in FIGURE 1, the vane having been rotated slightly.

Referring now to FIGURE 1, numeral 10 indicates the rear portion of the wall of the nozzle of a rocket engine. A rotatable vane 11 is mounted in an accurately contoured socket 11a in a circular disc 12 set into a circular cutout or hole in the wall 10 of the nozzle. The vane 11 is clamped to the disc 12 by machine screws 13 passing through the bottom wall of the socket in disc 12 and entering tapped holes extending into the body of vane 11.

The interior surface 14 of disc 12 is machined to conform to the contour of the interior of the nozzle when the vane 11 lies on the longitudinal axis of the nozzle, but the outer surface 15 of disc 12 is flat, as seen in FIGURE 3.

The outer surface 15 of disc 12 lies against the flat inner surface of a mounting box 16 welded to the outer surface of the nozzle, as indicated in FIGURES 1 and 3.

The disc 12 is firmly drawn toward the inner surface of box 16 by an operating shaft 17 having a plain inner end 18 pinned to the disc 12 by a pin 19. The pin is inserted through a transverse hole 20 in the disc with which a transverse hole 20' in the inner portion of shaft 17 may be aligned. The plain surfaced end of shaft 17 extends through a central hole 21 in the mounting box bottom and the shaft is threaded outwardly of the bottom of the mounting box. An adjustable pressure plate 21' which is internally threaded is screwed onto the threaded portion of shaft 17 and retained in adjusted position by a set screw 22.

A pressure ring seal 23 is positioned in a peripheral groove in the edge of disc 12. Ball bearings 24 are preferably mounted between the flat face of disc 12 and the inner face of mounting box 16 and ball bearings 25 are positioned between the outer face of box 16 and the face of the pressure plate 21.

Vane 11 is angularly adjusted by control means (not shown) of any suitable type connected to shaft 17.

The vane 11 is angularly adjusted through relatively small angles so that the side edges of the disc 12 will move out of the inner surface of the nozzle by a very small amount and this disconformity of surface can be reduced to negligible amounts by slight fairing of the surfaces at the appropriate areas.

If the vane is to be fitted in a rocket engine having an extended flight duration, the leading edge of the vane may be fitted with a cap 26 of high heat resistant material such as graphite.

It will be noted that the operating shaft 17 is not exposed to the flow of the high velocity and highly heated gas flowing through the nozzle and no obstruction to the gas flow is present, thus preventing the formation of shock waves and damage to the installation and nozzle at the area the shock waves are formed.

It will be evident the mounting means for the vane affords ample support to the vane and relieves the operating shaft of bending stresses. The provision of the adjustable pressure plate 21 and of anti-friction means provide a mounting arrangement for the vane capable of accurate adjustment and requiring little force to operate. Should it be desired to extend the vane clear across the nozzle, the opposite end of the vane may be supported by structure as previously described, or differing only by the omission of controlling means connected to the shaft secured to the base disc.

A preferred embodiment of the invention has been described and shown by way of illustration only and not as limitative of the invention, the scope of which is defined by the appended claims.

I claim:

1. A rocket control means mounted in the curved surface of a rocket nozzle, comprising a circular recess in said nozzle, a circular disc mounted in said circular recess and having an inner face and an outer face, a vane fixedly mounted on the inner face of said circular disc, a box secured to the outer surface of said nozzle and enclosing said circular disc and said recess, an operating shaft having its inner end secured to said vane and extending outwardly through said disc and through the wall of said box, adjustable means positioned on said operating shaft exteriorly of said box and adapted to bear against the outer surface of said box to draw said vane and said circular disc toward the inner surface of said box, a seal positioned about the outer circumferential surface of said circular disc in contact with the inner circumferential surface of said circular recess, the inner face of said circular disc being contoured to conform with the curved surface of said rocket nozzle when said vane is disposed longitudinally of said nozzle.

2. A rocket control as set forth in claim 1 and, in addition, anti-friction means positioned between the outer face of said circular disc and the inner face of said recess.

3. A rocket control as set forth in claim 1, wherein the leading edge of said vane is formed of high heat resistant material.

References Cited by the Examiner

UNITED STATES PATENTS 2,957,228  10/1960  Stoddard et al. ____ 230—114 X
2,969,017  1/1961  Kershner.

FOREIGN PATENTS 1,217,446  12/1959  France.
733,321  7/1955  Great Britain.

OTHER REFERENCES

Solid-Propellant Motors, in Flight magazine, Jan. 13, 1961, p. 42.

MARK NEWMAN, *Primary Examiner.*

SAMUEL LEVINE, *Examiner.*

T. BLUMENSTOCK, *Assistant Examiner.*